(12) United States Patent
Gietenbruch et al.

(10) Patent No.: US 6,531,665 B2
(45) Date of Patent: Mar. 11, 2003

(54) BALANCE WITH A TILTABLE OPERATOR CONSOLE

(75) Inventors: Matthias Gietenbruch, Buchs (CH); Roger Leisinger, Zürich (CH); Alfred Schillig, Grüningen (CH); Bruno Mattle, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 126 days.

(21) Appl. No.: 09/854,214

(22) Filed: May 11, 2001

(65) Prior Publication Data
US 2002/0000337 A1 Jan. 3, 2002

(30) Foreign Application Priority Data
May 19, 2000 (DE) .......................... 100 24 408

(51) Int. Cl.$^7$ ............................... G01G 21/00
(52) U.S. Cl. .................. 177/126; 177/180; 177/238
(58) Field of Search ................... 177/126, 127, 177/180, 181, 182, 238–244

(56) References Cited

U.S. PATENT DOCUMENTS

| | | | | |
|---|---|---|---|---|
| 4,979,579 A | * | 12/1990 | Dardat et al. ............... | 177/180 |
| 5,345,043 A | * | 9/1994 | Luechinger et al. ........ | 177/180 |
| 5,841,076 A | | 11/1998 | Schwartz et al. ......... | 177/25.13 |
| 6,037,548 A | | 3/2000 | Baitz et al. ............... | 177/25.13 |
| 6,441,323 B1 | * | 8/2002 | Montagnino ................ | 177/126 |

* cited by examiner

Primary Examiner—Randy W. Gibson
(74) Attorney, Agent, or Firm—Friedrich Kueffner

(57) ABSTRACT

A balance has a balance housing (21), an operator console (4), and a pivot arrangement (17, 18, 22) between the balance housing and the operator console. The pivot arrangement works as a hinge, so that the operator console can be tilted about a transverse horizontal axis (A) that runs parallel to the balance housing. From a normal working position, i.e., projecting forward from the balance housing, the operator console can be folded upward into a rest position. The pivot arrangement has a certain amount of loose play in at least one radial direction. The operator console has a tilt-adjustable part (20) and a tilt-angle adjusting device (26, 27, 28, 29) with a secondary transverse tilt axis (B) located in an anterior portion of the operator console. A locking device (30b, 33) serves to secure the tilt-adjustable part in one of at least two selectable tilt-angle positions.

18 Claims, 6 Drawing Sheets

BALANCE WITH A TILTABLE OPERATOR CONSOLE

BACKGROUND OF THE INVENTION

The present invention relates to a balance with a balance housing and an operator console, where the console is movably connected to the housing through a pivot arrangement. The pivot arrangement includes a pair of support arms projecting forward from the balance housing. The support arms have pivot pegs that are engaged in rimmed openings or bearings of the operator console, so that the pivot pegs define a transverse tilt axis substantially parallel to the balance housing. Being hinged on the transverse tilt axis, the operator console can be folded up from a horizontally projecting work position into a substantially vertical rest position. The pivot arrangement has a certain amount of loose play in at least one radial direction. A balance meeting the foregoing description corresponds to the German patent application DE 198 58 625.6, whose content shall be considered as incorporated herein by reference. As described in the referenced German patent application, a balance of the kind outlined above has numerous advantages.

OBJECT AND SUMMARY OF THE INVENTION

The present invention has the object of adding further advantageous features to a balance meeting the description given in the preceding paragraph.

First among the additional advantageous features, the operator console in a balance of the present invention has its own tilt-angle adjusting device, which allows the operator console to be tilted about a second transverse horizontal axis that is located in the forward portion of the operator console. Associated with the tilt-angle adjusting device is a locking device by which the angular position of the operator console in relation to the second transverse horizontal axis can be locked selectively in one of at least two different tilt-angle positions.

The present invention takes advantage of the fact that the pivotable connection with loose play or clearance play of the aforementioned earlier German patent application offers the possibility of providing the operator console with an added degree of mobility, so that the top surface of the operator console can be tilted about a transverse axis in order to optimize the viewing angle according to the height and relative eye position of a person looking at the display and operating elements on the operator console.

In principle, a multitude of diverse design concepts can be used to provide the tilt adjustment of the operator console about the transverse axis. For example, one might consider a spindle mechanism driven by a small motor. However, it has proven to be preferable if the operator console has its own tilt-angle adjusting device by which a part of the operator console can be tilted about a secondary transverse axis that is located in the forward portion of the operator console. Because the tilt-adjustable part of the console is exposed to forces, e.g., when keys on the console are pressed by an operator, the tilt-angle adjusting device includes a tilt-angle locking device by which the angular position of the operator console can be locked selectively in one of at least two different tilt-angle positions. As a further preferred feature, the tilt-angle adjusting device can include a force-biasing element that exerts a biasing force against the tilt-adjustable part, urging the latter in a predetermined tilt direction relative to the secondary transverse axis.

The tilt-angle locking device could be designed, e.g., with a clamping screw or a latching device. However, an arrangement is favored in which the tilt-angle locking device works as an elastically biased detent device that cooperates with at least one corresponding detent stop of the operator console, because this arrangement has proven to be easier to use for the operator.

It will be appreciated that the mobility of the operator console in relation to the balance housing makes it more difficult to electrically connect the console to the housing through a cable. A further developed concept of the invention solves this problem by providing a length-adapting device for the cable, by which the effective cable length can be adjusted to the position of the operator console.

The length-adapting device could be a spring-biased coil drum for the cable, but in the preferred design the length-adapting device has one or more cable guides in a cable housing, where the cable can be dressed around the cable guides in a loop of selectable length. The loop arrangement requires less space than other possible concepts of the length-adapting device.

In advantageous configurations, the cable housing is part of the operator console, located at the underside or possibly in the left or right end portion of the operator console. This arrangement is preferred over an alternative solution of incorporating the cable housing in the balance housing, because with the latter alternative the balance would have to be leveled again after each access to the cable housing.

Further details of the invention are presented in the following description of a preferred embodiment as shown schematically in the drawing.

DETAILED DESCRIPTION OF THE INVENTION

Figure 1:
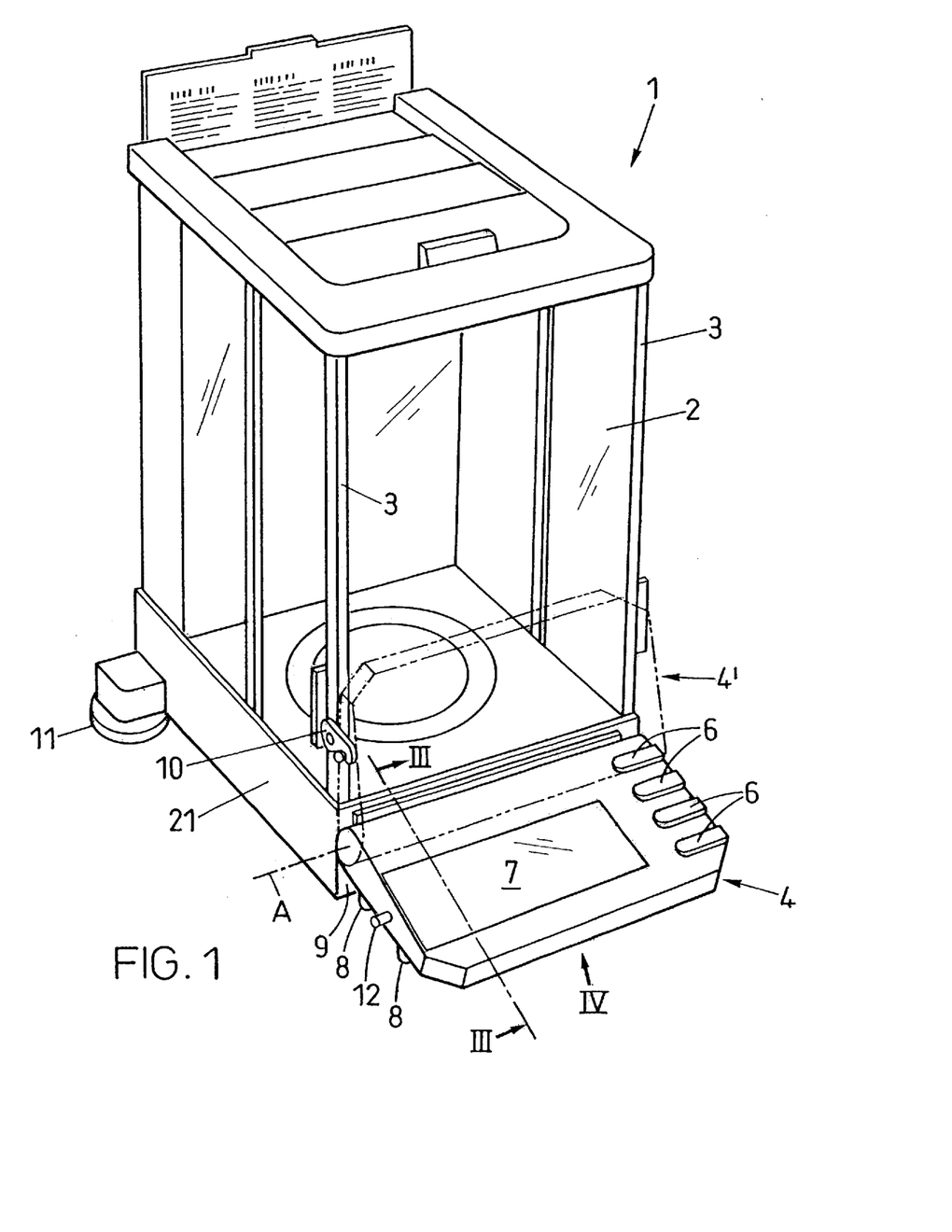
FIG. 1 represents a perspective view of a balance according to the invention.

The following description of FIG. 1 will cover the parts of the balance of the aforementioned German patent as far as necessary in order to gain an understanding of the present invention.

The balance 1 of FIG. 1 has a draft shield 2 resting on a balance housing 21 with at least one height-adjustable leveling foot 11 at the rear. An operator console 4 is attached to a front wall plate 9 of the balance housing 21. The operator console 4 is pivotally connected or hinged on the front wall plate 9 so that it is rotatable at least approximately about a pivot axis A. Thus, it is possible to tilt the operator console 4 from its working position (shown in solid lines in FIG. 1) to its folded-up rest position 4' (shown in dash-dotted lines) against the front of the draft shield 2. The fold-up operator console has several advantages:

the balance is easier to carry from one place to another;
the operator console is less prone to collect dirt in the folded-up position;
the balance takes up less space when it is put in storage;

the area underneath the operator console is easier to clean. As a further advantage, because the operator console 4 is coupled only loosely to the balance housing 21 through two short pivot pegs 17 (shown in FIG. 2*a*), the heat flow from the operator console 4 to the balance housing 21 is restricted.

The present invention adds the advantage of a tilt-adjustable work position to the benefits of the above-referenced earlier patent application.

The operator console 4 in the illustrated embodiment has four push keys 6 as well as a display screen 7. The display screen 7 may also have touch-sensitive areas that perform input functions. The illustrated embodiment of the operator console 4 is relatively simple, yet its lengthwise dimension projecting forward from the front wall plate 9 may be considerable. To prevent a tilting moment on the balance housing 21, which could be caused by pressing down on one of the parts 6 or 7, it is practical to provide the operator console with feet 8. Because the attachment of the operator console 4 to the front wall plate 9 of the balance housing 21 at the pivot axis A has loose play at least in the vertical direction, the feet 8 of the operator console 4 will plant themselves solidly on the work table surface, independent of the main part of the balance. Thus, even when there is a variable load on the feet 8 as a result of operator activity on the console 4, and if the feet 8 are rubber-cushioned and therefore yield slightly under load, there is no tilting force transmitted to the housing 21.

As was already mentioned above, the operator console 4 can be tilted from its working position (shown in solid lines) to its rest position 4' (shown in dash-dotted lines). It is advantageous to provide a locking device or detent device for at least one of the two positions in order to hold the operator console securely in the respective position. In the illustrated embodiment, there is a swiveling latch 10 arranged on one of the vertical posts 3 of the draft shield 2. The latch 10 locks the operator console 4 in its rest position 4' by engaging a locking pin 12 on the side of the operator console 4. Obviously, the illustrated locking device represents only an example and could be replaced by any known kind of locking device. It can further be advantageous to also provide a detent or locking device for the illustrated working position of the operator console.

Figure 2A:
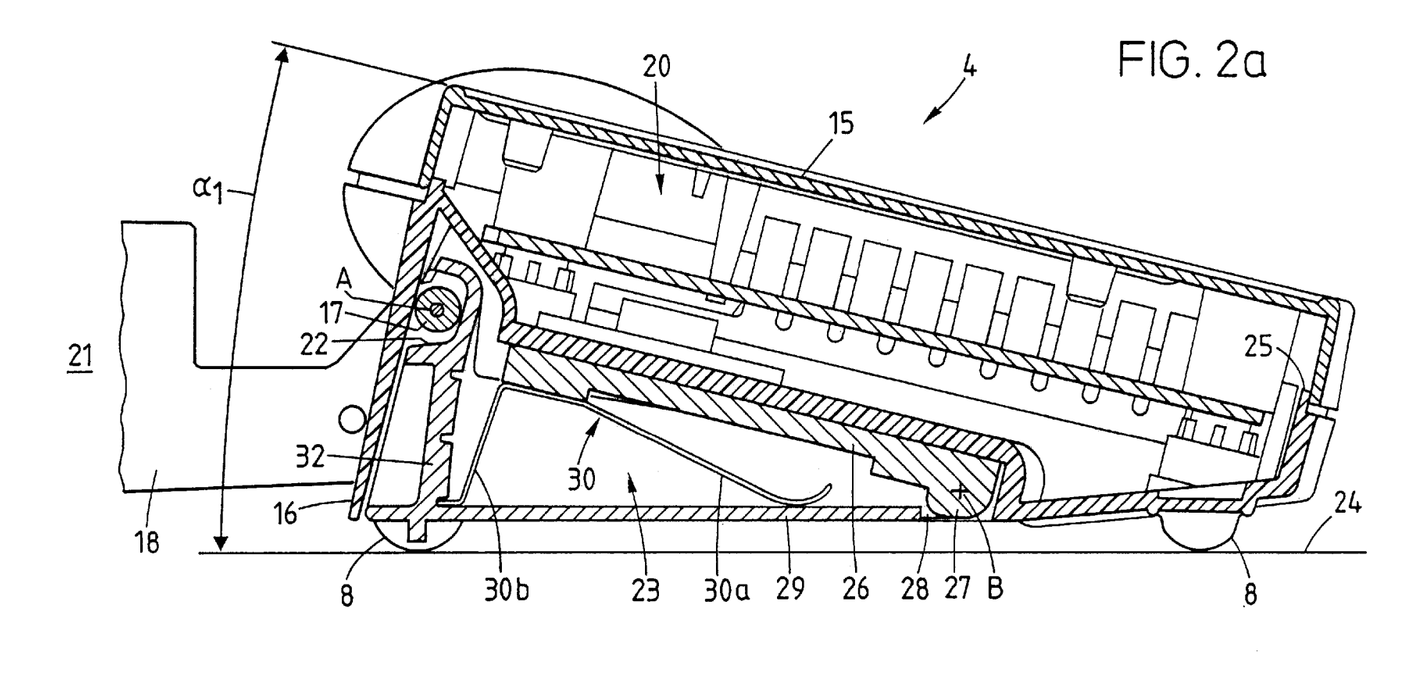
FIGS. 2a to 2c represent the operator console in a cross-sectional plane close to the line III—III of FIG. 1 in three different tilt positions.
Figure 2B:
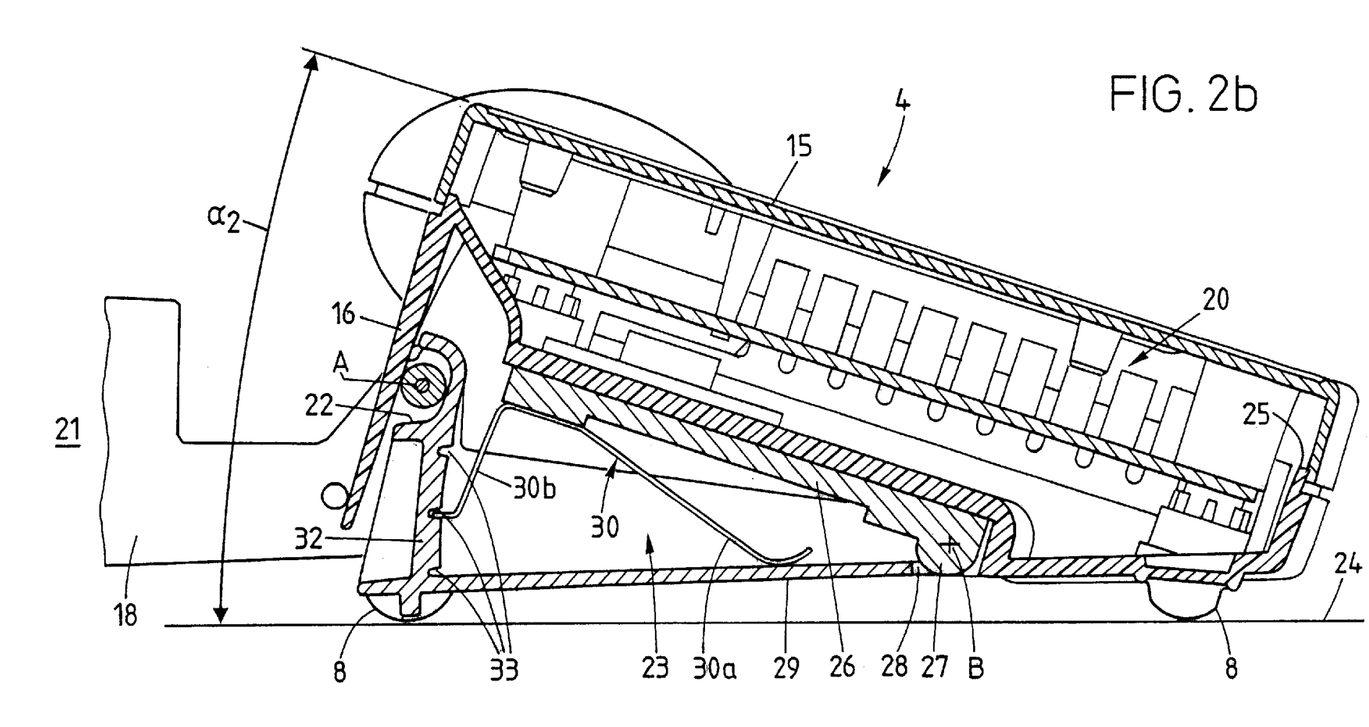
Figure 2C:
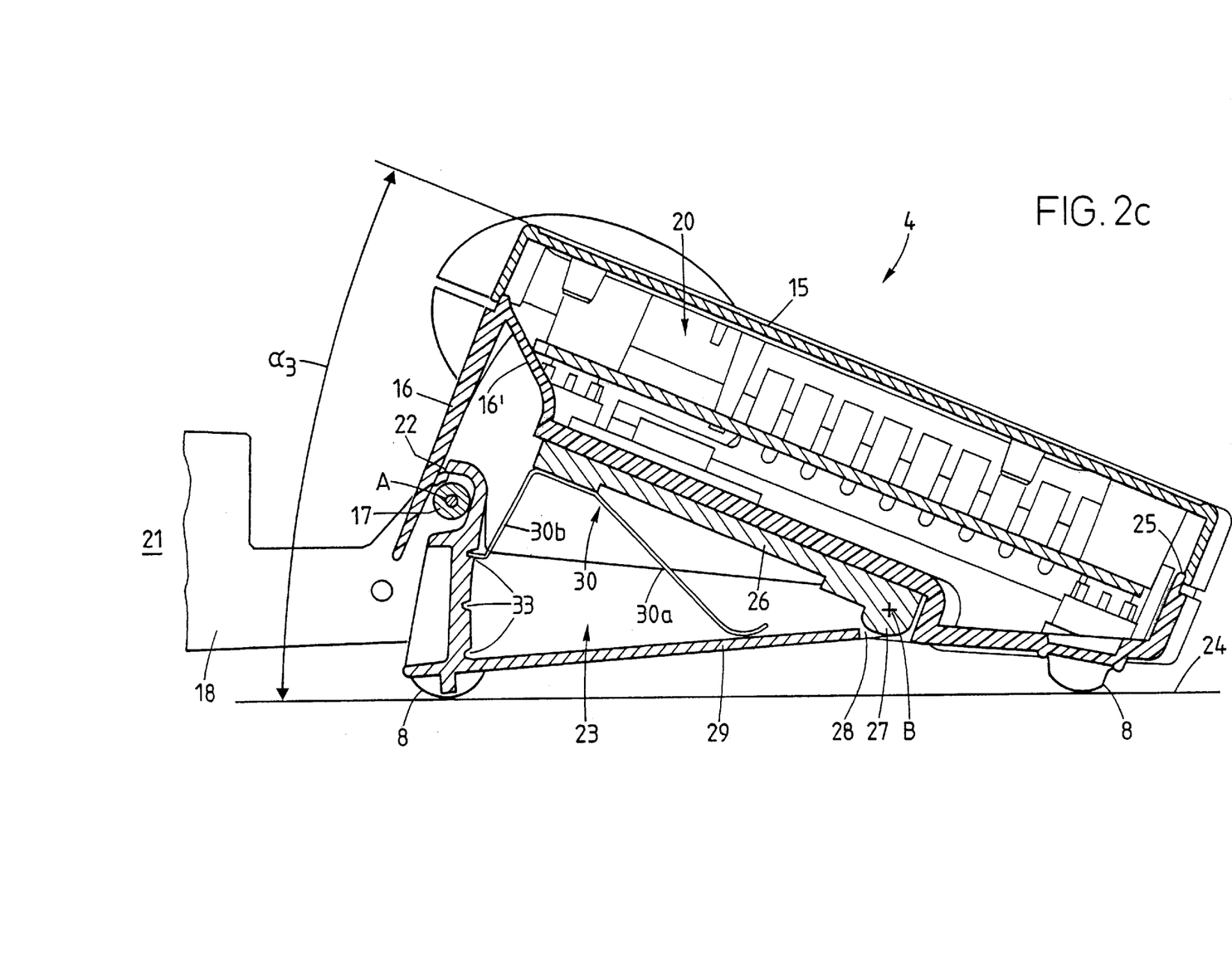

According to FIGS. 2*a* to 2*c*, the arrangement for tilting the operator console 4 about the axis A includes two arms 18 projecting forward from the balance housing 21 with pivot pegs 17 defining the tilt axis A. One of the pivot pegs 17 is shown in cross-section at a location close to the line III—III. The pivot pegs 17 are engaged in a vertically elongated rimmed opening 22, so that the pegs 17 have a certain amount of free play in the up and down direction. However, the rimmed openings 22 surround the pegs 17 only partially, like a U-shape that is open towards the balance housing (the location of the latter being indicated only by the reference number 21 in FIGS. 2*a* to 2*c*). The partially open rims 22 allow the operator console 4 to be easily separated from the balance housing 21 if desired.

In order to prevent dirt from getting inside the operator console from the rear, i.e., from the side of the pivot arrangement, the operator console is designed with a box-like enclosure with a rear wall 16 covering the open side of the rimmed openings 22. The rear wall 16 needs to have a sufficiently snug sealing fit against the pivot elements 17, 18 and 22, but without impeding the angular movement of the main portion of the operator console about the axis B, which will be described below. The rear wall 16 should therefore be of a shape and orientation that its distance from the rimmed opening 22 and the pivot peg 17 remains about the same when the main portion of the operator console is rotated about the transverse pivot axis B. The rear wall could also be elastic, e.g., designed as a resilient sheet-metal plate or, as shown in the drawing, as a wedge-shaped flap of plastic material, which rests against the rimmed opening without impeding the free play of the pivot peg 17.

In the illustrated favored embodiment, the rear wall 16 represents one leg of a substantially V-shaped pair of walls 16, 16' that belong to the tilt-adjustable part of the operator console and surround the hinge-pivot elements 17, 18, 22, preferably leaving a certain amount of clearance space. On one hand, the rear wall helps to seal off the rear of the operator console and on the other hand, it serves as a guide for the tilt-adjustable part of the operator console when the latter is brought from the position illustrated in FIG. 2*a* to another tilt-angle position as shown in FIG. 2*b* or 2*c*.

In another embodiment, the rimmed opening 22 and/or the rear wall 16 and the pivot peg 17 can be designed with a shape that allows the required loose play independent of the tilt angle when the operator console 4 is in a working position, but offers a resistance in the form of an opposing torque that has to be overcome when tilting the console 4 upward into its rest position 4' and again when returning the console 4 to its working position. In other words, the rimmed opening, pivot peg and rear wall cooperate to form an elastically biased holding device to retain the operating console 4 in its up-tilted rest position 4'. An arrangement of this kind can be realized, e.g., by designing the pivot peg with a cam or an elliptic cross-section cooperating with a partially resilient rimmed opening and/or a resilient rear wall in such a way that the rimmed opening and the rear wall are forced apart when the operator console is tilted up about the axis A, so that an opposing torque has to be overcome on the way up and the operator console is retained in its rest position by a spring-biased clamp hold on the pivot peg. Obviously, there are alternative design configurations by which the same objective of a spring-biased position-holding arrangement can be achieved.

The principal components of the operator console 4 are a top housing 20 with a top panel 15, and a base part 23 with side walls extending upwards so as to resemble a box and feet 8 by which the console rests on a worktable surface 24. The base part 23 is stepped down in thickness along its upper rim 25, and the top housing 20 slips over the stepped-down portion like the cover of a box.

The base part 23 is configured as a wedge-like adjusting mechanism consisting essentially of a support element 26 and a floor plate 29 as well as a detent arrangement with a spring 30*b* engaging groove shaped stops 33 (FIGS. 2*b* and 2*c*). The tilt angle of the top housing 20 in relation to the floor plate 29 of the base part 23 is adjustable, so that the top panel 15 with the operating and indicating elements 6, 7 (shown in FIG. 1) can be set to a working position that is most favorable for the viewer, e.g., to avoid annoying light reflections. The console of the illustrated example has three different tilt positions at tilt angles $\alpha_1$, $\alpha_2$, $\alpha_3$. To provide a fulcrum for the tilting motion of the enclosure top 20, the support element 26 has an attached or integrally formed rounded body 27 that sits in an opening or recess 28 of the floor of the base part 23. This configuration is particularly conducive to a simple installation of the top housing 20 on the base part 23. Of course, the break-through opening 28 in the floor plate 29 of the base part 23 could be replaced by a mere recess in the floor plate 29. In either case, the rounded fulcrum body 27 functions as a transverse axis of rotation for the tilt-angle adjustment of the top panel 15 in relation to the worktable surface 24. It is to be understood that this arrangement represents only one, albeit preferred, example of a possible tilting mechanism, and that a person skilled in the art will have a sufficient number of design alternatives available in the field of tiltable consoles or related areas.

Figure 3:
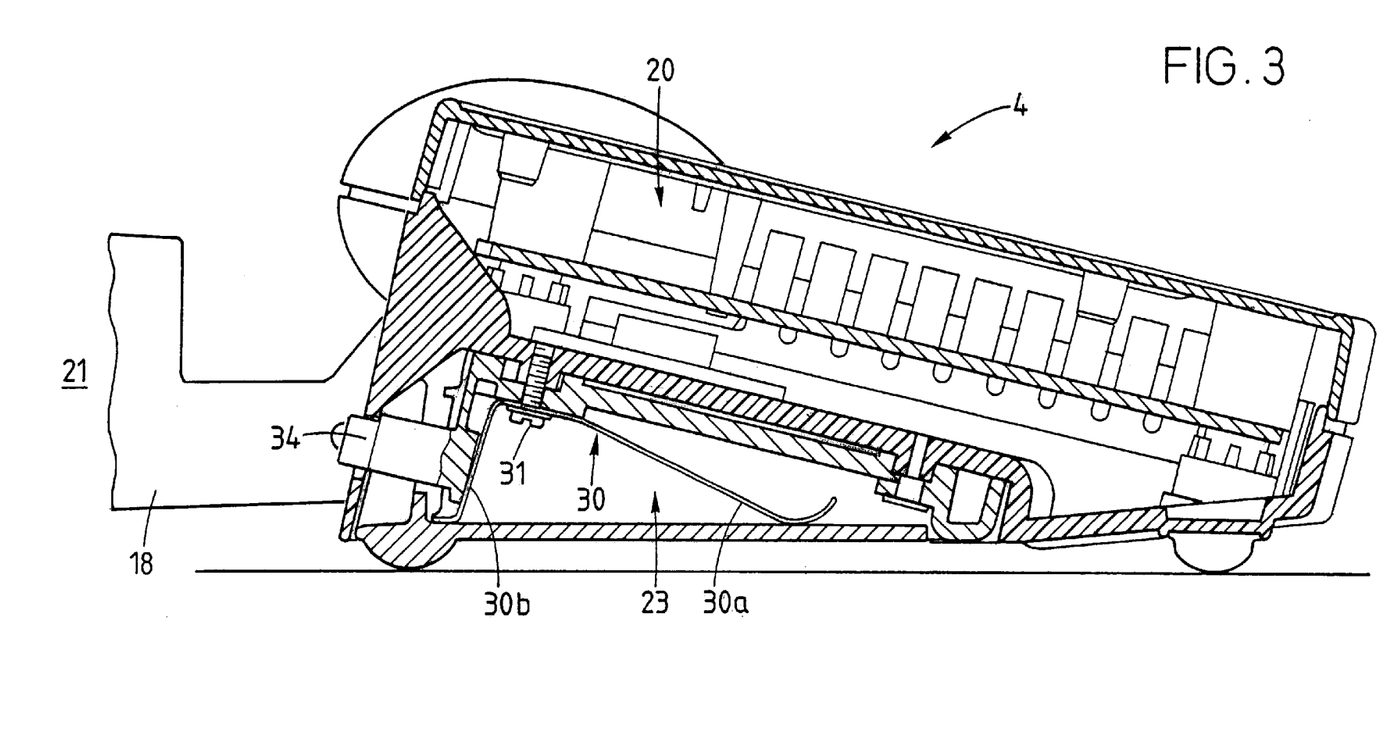
FIG. 3 represents a sectional view in the cross-sectional plane indicated by the line III—III of FIG. 1 through the middle of a wedge-like adjusting mechanism.

As shown in FIG. 3, a leaf spring 30 is attached at its mid-portion to the underside of the support element 26 by at least one screw 31. Preferably, the leaf spring 30 has legs 30a and 30b extending in opposite directions from the mid-portion. The leg 30a is elastically biased against the floor plate 29 of the base part 23 and, as a reaction, exerts an upward-pushing force on the enclosure top 20. The leg 30b of the leaf spring 30 serves as a position-locking element by engaging one of the grooves 33 that are formed as detent stops in a wall 32 that also contains the rimmed opening 22. In the illustrated case, the tilt-angle locking arrangement is based on a positive, form-locking engagement between a projecting element and its counterpart, i.e. a recess or groove. However, it should be obvious, that the positive, form-locking engagement could also be replaced by a contact force engagement where a spring-biased resilient element would be seated in a shallow recess of its counterpart element, so that the position-securing detent connection could be released by pushing on the top housing 20. However, this is not one of the preferred solutions because of the risk that the position-securing engagement would not hold firm if an operator pushed one of the keys 6 (FIG. 1) too energetically. It is also conceivable to design the detent stops with a skewed saw-tooth shape to produce a ratchet-type of engagement where the top housing 20 can be pushed downwards with the tongue of the leaf-spring gliding over the shallow-sloped tooth flanks, but where a movement of the top housing in the upward direction is possible only after releasing the detent engagement, e.g., by means of a push button as will be described subsequently.

It should further be understood that one could also use two separate spring elements for the functions that are performed by the two legs 30a and 30b of a single spring element 30. The force-biasing function of the leaf spring leg 30a could also be performed by other elastic devices, pneumatic elements, magnets, or other force-generating elements. As another alternative, one could arrange the force-biasing element so that the force acts in the opposite direction, i.e., urging the top housing 20 from the position of FIG. 2c towards the position of FIG. 2a. However, the arrangement as illustrated and described above represents the preferred solution.

With the form-locking detent arrangement described above—and also with a locking device that is not elastically resilient—it is practical to have an actuator device for the release of the position-securing connection. One might consider a design where the top housing 20 can be moved forward by a small amount in relation to the floor plate 29 and the wall 32, whereby the leaf spring leg 30b is retracted from engagement with one of the detent grooves 33 and is re-engaged by pushing the top housing 20 back to the rear of the small range of movement. However, this kind of arrangement would make it more difficult to seal the console and would not provide a secure lock of the selected tilt position. Therefore, an arrangement with an actuator device including a push button 34, as shown in FIG. 3, is considered a more favorable design. The push button 34 is located in the vicinity of the cross-sectional plane indicated by the line III—III of FIG. 1, at the rear of the operator console 4 and next to the place where the leaf spring leg 30b is engaged in the groove-shaped detent stops 33 of the wall 32. However, the actuator device could also be arranged at another location.

Figure 4:
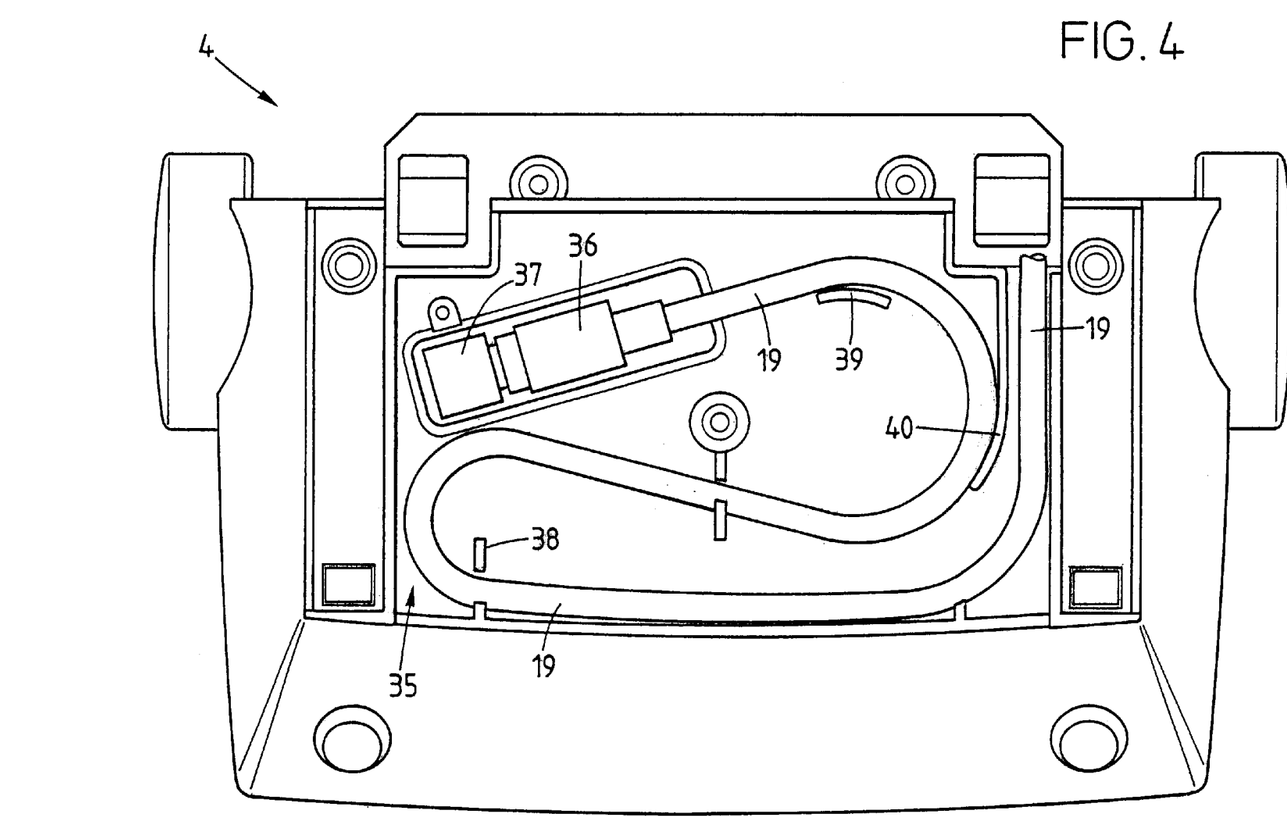
FIG. 4 represents the underside of the operator console with the cable housing uncovered, viewed in the direction indicated by the arrow IV of FIG. 1.

As was mentioned above, because the present invention adds another degree of mobility to the operator console 4 by allowing a tilt angle adjustment relative to the transverse axis B, it becomes necessary to make appropriate arrangements for the electrical connection to the balance housing 21. According to a more highly developed stage of the present invention, this problem is solved by providing a length-adapting device for the cable 19 as illustrated in FIG. 4. In principle, the length-adapting device could be accommodated in the balance housing 21. However, in the favored design solution of FIG. 4, the length-adapting device is arranged in a cable housing 35 in the floor of the operator console 4. FIG. 4 shows the cable 19 exposed for illustration purposes, although the preferred embodiment according to the invention includes a cover plate (not shown) arranged in a known and customary way to close off the cable housing.

The cable 19 can have a connector plug 36 inserted into a plug-in receptacle 37 of the operator console 4, so that the cable 19 can be separated from the operator console 4. However, as a feature of practical importance, the cable housing 35 contains at least one cable-looping arrangement, where the effectively available cable length can be adapted to the position of the operator terminal 4 by selectively routing the cable around the first, second and/or the third of the cable guides 38, 39, 40.

List of Reference Numbers

| | |
|---|---|
| 1 Balance | 2 Draft shield |
| 3 Vertical post | 4, 4' Operator console |
| | 6 Push keys |
| 7 Display screen | 8 Feet |
| 9 Front plate | 10 Latch |
| 11 Leveling foot | 12 Locking pin |
| 15 Top panel | 16, 16' Walls |
| 17 Pivot peg | 18 Support arm |
| 19 Cable | 20 Top housing |
| 21 Balance housing | 22 Rimmed opening |
| 23 Base part | 24 Worktable surface |
| 25 Stepped-down upper rim | 26 Support element |
| 27 Rounded fulcrum body | 28 Recess |
| 29 Floor plate | 30 Leaf spring |
| 30a Leg of 30 | 30b Leg of 30 |
| 31 Screw | 32 Wall |
| 33 Detent grooves | 34 Push button |
| 35 Cable housing | 36 Connector plug |
| 37 Plug-in receptacle | 38–40 Cable guides |

What is claimed is:

1. A balance comprising a balance housing, an operator console, and a pivot arrangement between the balance housing and the operator console;
   the pivot arrangement comprising forward-projecting support arms on the balance housing, pivot pegs on the support arms defining a transverse tilt axis (A) substantially parallel to the balance housing, and rimmed openings on the operator console that are engaged by the pivot pegs with loose play in at least one radial direction, so that the operator console is rotatable about the transverse tilt axis between a forward-projecting work position and an upward-tilted rest position,
   wherein the operator console comprises a tilt-adjustable part and a tilt-angle adjusting device with a secondary transverse tilt axis (B) located in an anterior portion of the operator console, and a tilt-angle locking device to lock the tilt-adjustable part in one of at least two selectable tilt-angle positions.

2. The balance of claim 1, wherein the tilt-angle adjusting device comprises a floor plate with a recess, and a support element with a rounded fulcrum body rotatably seated in the recess and functioning as the secondary transverse tilt axis (B).

3. The balance of claim 2, wherein the operator console comprises a base part, the tilt-adjustable part comprises a top housing connected to the support element, the tilt-angle adjusting device and the tilt-angle locking device are arranged in the base part, and a working position of the top housing can be selectively set at different tilt angles by rotating the base part in relation to the top housing about the secondary transverse tilt axis (B).

4. The balance of claim 3, wherein the base part has a top side and a stepped-down rim portion, the top housing has a bottom side enclosed by the top side of the base part, and the top housing slips over the stepped-down rim portion like a box cover.

5. The balance of claim 1, wherein the operator console has a rear side facing the balance housing and on said rear side comprises a rear wall that is fixedly attached to the tilt-adjustable part and extends downward from the tilt-adjustable part to cover the pivot arrangement.

6. The balance of claim 5, wherein the operator console comprises a further wall, said rear wall and said further wall together forming a V-shaped pair of walls enclosing the pivot arrangement and leaving a clearance space between the pair of walls and the pivot arrangement.

7. The balance of claim 5, wherein the rimmed openings surround the pivot pegs only partially, the rimmed openings forming U-shapes with open ends pointing to the rear side.

8. The balance of claim 7, wherein the rimmed openings, the pivot pegs and the rear wall are designed so that an opposing torque has to be overcome when rotating the operator console from the forward-projecting work position to the upward-tilted rest position and vice versa.

9. The balance of claim 2, wherein the tilt-angle adjusting device comprises a force-biasing element exerting a biasing force between the floor plate and the tilt-adjustable part, biasing the latter in a predetermined tilt direction relative to the secondary transverse tilt axis (B).

10. The balance of claim 1, wherein the tilt-angle locking device comprises an elastically biased detent device and at least one detent stop, the detent device being arranged to engage the at least one detent stop.

11. The balance of claim 9, wherein the tilt-angle locking device comprises an elastically biased detent device and at least one detent stop, the detent device being arranged to engage the at least one detent stop; wherein further the force-biasing device and the tilt-angle locking device are formed out of a single spring element; said single spring element comprising a mid-portion attached to the tilt-adjustable part, a first leg extending downward from the mid-portion and constituting the force-biasing device, and a second leg extending from the mid-portion and constituting the detent device.

12. The balance of claim 10, wherein the detent device and the at least one detent stop are designed for a positive, form-locking engagement between each other.

13. The balance of claim 12, wherein the tilt-angle locking device comprises an actuator device for releasing the form-locking, positive engagement.

14. The balance of claim 13, wherein the actuator device comprises a push button arranged to act against the elastically biased detent device.

15. The balance of claim 1, further comprising at least one cable connecting the operator console with the balance housing, and a length-adapting device whereby an effective cable length can be adapted to requirements.

16. The balance of claim 15, further comprising a cable housing, wherein the length-adapting device comprises at least one set of cable guides arranged in the cable housing and the effective cable length is adapted to requirements by selectively routing the cable around the cable guides.

17. The balance of claim 16, wherein the cable housing is arranged at the operator console.

18. The balance of claim 17, wherein the operator console has an underside facing downward when the operator console is in the work position and wherein the cable housing is arranged at said underside.

* * * * *